US006517597B2

(12) United States Patent
Filges et al.

(10) Patent No.: US 6,517,597 B2
(45) Date of Patent: Feb. 11, 2003

(54) INSERTION ELEMENT SUBJECT TO THERMAL STRESS AND WEAR, IN PARTICULAR, A SEGMENT FOR THE ASSEMBLY OF A SEGMENTED CYCLONE DIP TUBE

(75) Inventors: Ralf Filges, Bergisch-Gladbach (DE); Horst Schilling, Cologne (DE)

(73) Assignee: KHD Humboldt Wedag AG, Cologne (DE)

(*) Notice: Subject to any disclaimer, the term of this patent is extended or adjusted under 35 U.S.C. 154(b) by 0 days.

(21) Appl. No.: 09/853,264

(22) Filed: May 11, 2001

(65) Prior Publication Data

US 2001/0052223 A1 Dec. 20, 2001

(30) Foreign Application Priority Data

May 12, 2000 (DE) ........................................ 100 23 387
Jul. 7, 2000 (DE) ........................................ 100 23 293

(51) Int. Cl.[7] .......................... B01D 35/14; B01D 45/12
(52) U.S. Cl. ........................................ 55/435; 55/459.1
(58) Field of Search ................................ 55/435, 459.1

(56) References Cited

U.S. PATENT DOCUMENTS 3,470,678 A * 10/1969 Clark et al. ................ 55/434.1
4,505,051 A * 3/1985 Herchenbach et al. ........ 34/594
5,371,944 A * 12/1994 Guenther .................... 123/669
5,417,932 A * 5/1995 Castagnos et al. .......... 422/147

FOREIGN PATENT DOCUMENTS

DE 3228902 5/1987

* cited by examiner

*Primary Examiner*—Robert A. Hopkins
(74) *Attorney, Agent, or Firm*—Charles L. Schwab; Nexsen Pruet Jacobs & Pollard, LLC

(57) ABSTRACT

A heat-resistant and wear-resistant insertion element or segment of a segmented dip tube suitable for use in a refractory-lined cyclone of a cement clinker production line. The insertion element, is capable of being fabricated and installed with a length greater than 120 cm, and is distinguished by a long service life. The insertion element may be a composite structure made of a metallic carcass or sheet (10) and a metallic mesh with webs (11) forming lattice-shaped openings which are filled with a heat-resistant ceramic composition (12).

9 Claims, 1 Drawing Sheet

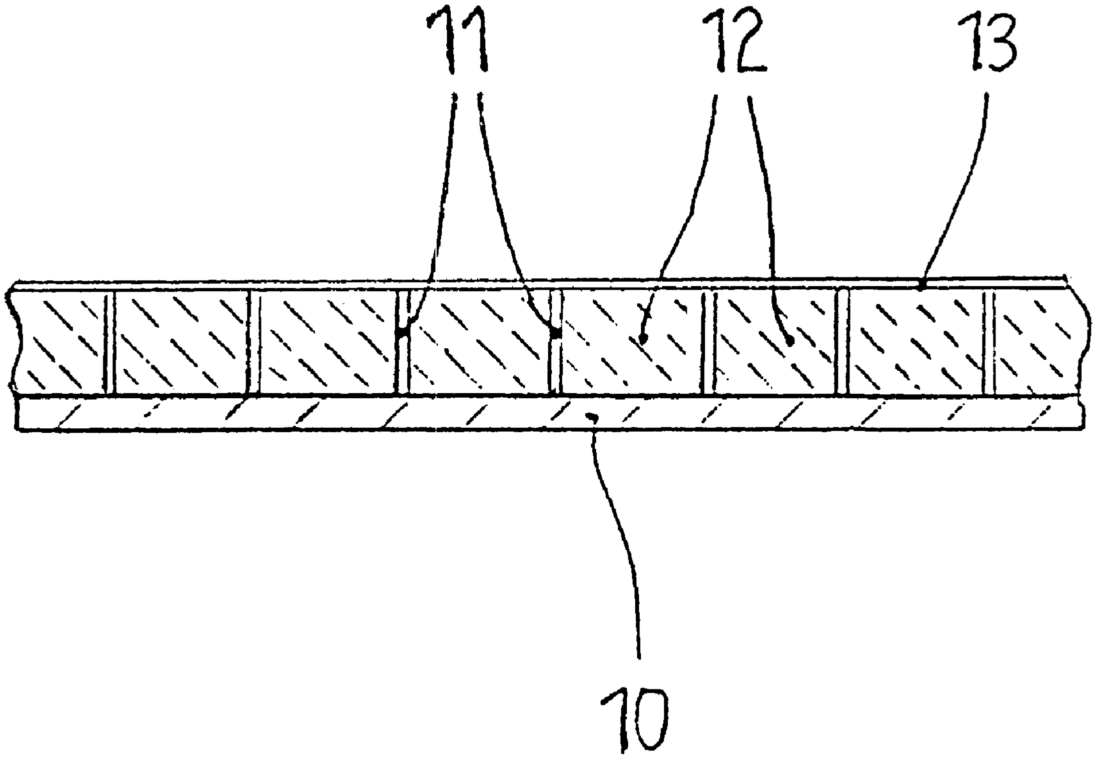
11
12
13
10

INSERTION ELEMENT SUBJECT TO THERMAL STRESS AND WEAR, IN PARTICULAR, A SEGMENT FOR THE ASSEMBLY OF A SEGMENTED CYCLONE DIP TUBE

TECHNICAL FIELD

This invention relates to an insertion element subject to thermal stress and wear, in particular a segment for the assembly of a dip tube which extends centrally from above into a refractory-lined cyclone separator of a cement clinker production line and can be suspended on the cyclone deck.

BACKGROUND OF THE INVENTION

Installations for the production of cement clinker from cement raw meal include a rotary kiln and, connected upstream thereof as viewed from the material flow end, a cyclone suspension heat exchanger with a calcinator. In the cyclone suspension heat exchanger system, the cement raw meal is preheated in combined co-current/counter-current with the hot flue gas of the calcination stage or of the rotary kiln, and the material precalcined in the calcination stage is separated from the hot gas in the lowermost cyclone of the cyclone suspension heat exchanger system and fed into the rotary kiln. The hot-gas cyclones of the cyclone suspension heat exchanger train, in particular the lowermost cyclone, which comes into contact with hot gas and hot meal at a temperature of, for example, 700 to 950° C., are naturally subject to severe mechanical, chemical and thermal stress and thus to severe thermochemical and abrasive wear. This applies especially to the dip tube extending centrally from above into the cyclone separator.

German patent document DE-C-32 28 902, issued May 27, 1987 to Klöckner-Humboldt-Deutz AG for a Cyclone Separator, discloses a dip tube having a plurality of segments connected to one another in detachable fashion in order that individual dip tube segments can be renewed at a relatively low cost in time and effort in case of wear and deformations of the dip tube shell. It has already been suggested to fabricate the dip tube segments entirely from ceramic material, which, while it is heat-resistant, does not withstand more severe mechanical stresses. For this reason, dip tube segments are commonly fabricated from heat-resistant cast steel.

The casting of thin-walled dip tube segments, however, runs into limitations in that segments, if they are to be no thicker than approximately 15 mm, can be cast free of inhomogeneities only up to a length of approximately 120 cm. Large hot-gas cyclones, however, require correspondingly large dip tubes, in which the individual segments are to be well over 120 cm long and, for reasons having to do with installation, must not be too heavy.

OBJECTS AND SUMMARY OF THE INVENTION

It is an object of the invention to create an insertion element, in particular a segment for the assembly of a segmented dip tube subject to thermal stress and wear for a refractory-lined cyclone of a cement clinker production line, the individual insertion element being capable of being fabricated and installed with a length greater than 120 cm and distinguished by a long service life.

The heat-resistant and wear-resistant insertion element of this invention is a composite structure made up of a comparatively thin-walled and lightweight metallic carcass on which are arranged webs of a metallic lattice-like mesh. The lattice openings of the mesh are filled with a ceramic composition that is heat-resistant and wear-resistant with regard to mechanical and chemical actions. The heat-resistant ceramic composition is cast and/or injected and/or vibrated/vibratorily compacted and/or pressed into the lattice openings of the mesh, which may be elastic, for example, expanded metal mesh.

The heat-resistant ceramic composition is capable of flowing during the fabrication of the composite structure, and it may also be hardened by an additional heat treatment such as sintering, tempering, etc. The ceramic composition may include silicon carbide (SiC), and it may further include a hydraulic binder such as, for example, cement, which lends special strength to the ceramic composition after its hardens.

The integrated lattice mesh in the composite structure acts as reinforcement for the heat-resistant ceramic composition, which is intended to lie on the side subject to wear of the component assembled from the composite segments, and thus, in the case of the segmented cyclone dip tube, on the outside of the dip tube, which is severely stressed by the hot gas/solids suspension flowing into the cyclone.

In order that the surface of the composite insertion element has the smallest possible porosity, the surface of the ceramic composition and/or of the outside of the metallic carcass is provided with a heat resisting sealing coating, in particular glazing, glaze, enamel, and the like.

BRIEF DESCRIPTION OF THE DRAWING

The invention and its further features and advantages are explained in more detail on the basis of the exemplary embodiment illustrated in the drawing.

DETAILED DESCRIPTION OF THE INVENTION

The drawing is a section through a composite insertion element or segment made according to the invention, which includes a heat-resistant metallic sheet or carcass 10. The carcass 10 is made of a sheet of thin-walled, rolled steel material, for example 5 to 15 mm thick, to which webs 11 of a metallic mesh with lattice-shaped openings are adhesively attached or welded. During the fabrication of the insertion element, the lattice mesh 11 may be laid loose on the sheet 10.

The openings of the lattice mesh 11, which may be round, rectangular, hexagonal, or otherwise polygonal as viewed from above, are filled with a highly heat-resistant ceramic composition 12, which has been cast into the lattice openings, vibrated in and then hardened. For its protection, the surface of the ceramic composition 12 has a coating 13 with a very low porosity, in particular a glaze, a glazing, an enameling or the like. The thickness of the ceramic composition 12 may be, for example, 25 mm.

On the basis of the structure of the composite insertion element being made according to the invention, the metallic carcass 10 no longer needs to be made of a heat-resistant cast material, the thickness of which would have to be somewhat more than 15 mm in the case of large-format, long segments. Instead, with the structure according to the invention, heat-resistant and wear-resistant composite segments can be fabricated with a length of even more than 120 cm without the thickness of the metallic carcass 10 having to exceed 15 mm.

If the thermally and mechanically severely stressed dip tube of a cyclone of the cyclone suspension heat exchanger system/precalcinator system of a cement clinker burning installation is assembled from the composite segments, the heat-resistant ceramic composition 12 is arranged on the outer side of the metallic carcass 10, that is, the side on which the inflowing abrasive hot gas/solids suspension impinges. It is, however, also possible to arrange the layered structure of the composite structure according to the invention on both sides of the metallic carcass or sheet 10. In any case, the service life of the composite insertion elements or segments according to the invention is quite long.

If the metallic carcass 10 is made of cast steel, the metallic lattice-shaped mesh with its webs 11 can be completely or partially fabricated as a one-piece casting together with the carcass 10.

In addition to the fabrication of segmented cyclone dip tubes in cement clinker burning installations, the composite structures of this invention can also be used for the protection of other internals subject to severe thermochemical and abrasive wear, in particular for the protection of guide and/or control elements, such as pivoted changeover valves, impact gates or the like, built into hot-gas lines and hot-meal lines of cement plants.

What is claimed is:

1. In a cyclone suspension heat exchanger system including a cyclone having a dip tube, said dip tube comprising:

- a dip tube segment formed as a fabricated composite structure including
  - a thin metallic sheet (10),
  - a metallic lattice-shaped mesh on said metallic sheet (10), said mesh having webs (11) defining openings and
  - a heat resistant ceramic composition (12) filling said openings, said ceramic composition (12) being glazed with a coating of low porosity, heat resistant enamel.

2. A segment for a dip tube extending centrally from above into a refractory-lined cyclone separator of a cement clinker production line, comprising:

- a composite structure including
  - a metallic sheet (10),
  - a metallic lattice-shaped mesh secured to one side of said metallic sheet (10) with webs (11) forming openings, said metallic sheet (10) and said metallic lattice-shaped mesh being a one-piece casting, and
  - a heat-resistant ceramic composition (12) filling said openings.

3. The segment as set forth in claim 2 wherein said heat-resistant ceramic composition (12) is pressed into said lattice shaped openings of said mesh.

4. A segment for a dip tube extending centrally from above into a refractory-lined cyclone separator of a cement clinker production line, comprising:

- a composite structure including
  - a metallic sheet (10),
  - a metallic lattice-shaped mesh secured to one side of said metallic sheet (10) with webs (11) forming openings, and
  - a heat-resistant ceramic composition (12) including silicon carbide (Si C) filling said openings.

5. A segment for a dip tube extending centrally from above into a refractory-lined cyclone separator of a cement clinker production line, comprising:

- a composite structure including
  - a metallic sheet (10),
  - a metallic lattice-shaped mesh secured to one side of said metallic sheet (10) with webs (11) forming openings, and
  - a heat-resistant ceramic composition (12) filling said openings, said heat-resistant ceramic composition (12) including cement as a hydraulic binder.

6. A segment for a dip tube extending centrally from above into a refractory-lined cyclone separator of a cement clinker production line, comprising:

- a composite structure including
  - a metallic sheet (10),
  - a metallic lattice-shaped mesh secured to one side of said metallic sheet (10) with webs (11) forming openings, and
  - a heat-resistant ceramic composition (12) filling said openings, said heat-resistant ceramic composition including a coating of low porosity heat resisting enamel.

7. A segment for a dip tube extending centrally from above into a refractory-lined cyclone separator of a cement clinker production line, comprising:

- a composite structure including
  - a metallic sheet (10),
  - a metallic lattice-shaped mesh secured to each of the opposite sides of said metallic sheet (10), said mesh having webs, (11) forming openings, and
  - a heat-resistant ceramic composition (12) filling said openings.

8. In a cyclone suspension heat exchanger system including a cyclone having a dip tube, said dip tube comprising:

- a dip tube segment formed as a fabricated composite structure including
  - a thin metallic sheet (10),
  - a metallic lattice-shaped mesh on said metallic sheet (10), said mesh having webs (11) defining openings and
  - a heat resistant ceramic composition (12) filling said openings.

9. The heat exchanger system of claim 8 wherein said mesh is adhesively secured to said metallic sheet (10).

* * * * *